Patented Dec. 18, 1951

2,579,219

UNITED STATES PATENT OFFICE 2,579,219

VINYL POLYMER COMPOSITIONS CONTAINING AS A PLASTICIZER AN ESTER OF A PENTAERYTHRITOL HYDROXYALKYL ETHER

Christy J. Vander Valk, Clifton, N. J., assignor to Heyden Chemical Corporation, New York, N. Y., a corporation of Delaware No Drawing. Application August 18, 1948, Serial No. 44,988

11 Claims. (Cl. 260—31.4)

My invention relates particularly to vinyl resin compositions capable of being used for many different purposes, but which are especially applicable where a great degree of flexibility is desired at low temperatures, also where a high tensile strength is desired.

An object of my invention is to obtain vinyl resin or polymer compositions, plasticized by the presence of an ester of a hydroxyalkyl ether of one of the pentaerythritols, by which I mean pentaerythritol, dipentaerythritol, tripentaerythritol, and technical mixtures of the same. These plasticizers are found to impart thereto an exceptionally good flexibility at low temperatures as well as a higher tensile strength. For example vinyl resin films containing such plasticizers as, for instance, propionates or butyrates of pentaerythritol tetrahydroxyalkyl ethers, display low temperature flexibility as well as tensile strength superior to that which has been obtained with films plasticized by the more commonly used plasticizers, while the other properties obtained are at least as good. Further objects will appear from the detailed description hereinafter.

While my invention is capable of embodiment in many different forms, by way of illustration I have described hereinafter only certain embodiments thereof.

This invention is concerned, for instance, with the preparation of vinyl resin compositions which may contain by weight approximately 67.2 parts, or from 87.2 to 47.2 parts, of vinyl chloride-vinyl acetate copolymer containing, for instance, 90% thereof as vinyl chloride, or any other proportion thereof, 1.05 parts of a lubricant, or any other desired proportion thereof, 1.75 parts of a stabilizer, or any other desired proportion thereof, and 30 parts, or from 10 to 50 parts, of the ester of a hydroxyalkyl ether of pentaerythritol, such for instance as tetrabutyrate or tetrapropionate of the tetrahydroxyethyl or tetrahydroxypropyl ether of pentaerythritol, which serve as the plasticizer.

As more specifically exemplifying my invention, and the comparative properties of the plasticized products thus obtained: Vinyl polymer compositions were prepared in each of the following examples by mixing in a Banbury mixer, by weight, 67.2 parts of a vinyl-acetate-vinyl chloride copolymer, containing 90% thereof as vinyl chloride, 30 parts of the particular plasticizer hereinafter mentioned, 1.05 parts of carnauba wax as a lubricant, and 1.75 parts of basic lead carbonate as a stabilizer. The milled mass was transferred to mixing rolls maintained at 240–300° F., depending upon the plasticity of the batch, milled for approximately 10 minutes, and then sheeted. The sheets were cut to 5.5 inch squares and molded at 295° F. and 800 p. s. i. for 10 minutes. The low temperature flexibility of the molded sheets was determined as the temperature (° C.), at which a 1.5 x 0.5 inch sample, which had been cooled until rigid in a Dry Ice-alcohol bath, regained its flexibility. The other properties reported were determined by standard test methods. I have found, also, that all the plasticizers in the following table were compatible with the vinyl poylmer or resin over the range from 10 to 50 parts, or per cent, of the plasticizer, as compared with the vinyl polymer or resin.

The results of a series of tests follows, in a tabulation in which PE is used to signify pentaerythritol. All of the esters referred to in said tabulation were made from technical pentaerythritol, although any other pentaerythritol, dipentaerythrital or tripentaerythritol can be used therein.

| Example | Plasticizer | Low Temp. Flex. | Room Temp. Flex. | Shore Hardness 15 seconds | Ultimate Tensile lb./in.² | Volatility Per Cent wt. loss, 10 days at 105° C. |
|---|---|---|---|---|---|---|
| A | PE Tetrapropionate having the structural formula: $C(CH_2OOCCH_2CH_3)_4$ | −6 | 5.5 | 75 | 1,713 | fair. |
| B | Tetraacetate of PE tetrahydroxyethyl ether having the structural formula: $C(CH_2OCH_2CH_2OOCCH_3)_4$. | −8 | 4.9 | 84 | 2,870 | good. |
| C | Tetrapropionate of PE tetrahydroxyethyl ether having the structural formula: $C(CH_2OCH_2CH_2OOCCH_2CH_3)_4$. | −12 | 4.9 | 90 | 3,120 | Do. |
| D | Tetrabutyrate of PE tetrahydroxyethyl ether having the structural formula: $C(CH_2OCH_2CH_2OOCCH_2CH_2CH_3)_4$. | −25 | 5.3 | 75 | 2,250 | Do. |
| E | Tetraacetate of PE tetrahydroxypropyl ether having the structural formula: $C(CH_2OCH_2CH_2CH_2OOCCH_3)_4$. | −11 | 4.9 | 87 | 3,160 | Do. |
| F | Tetrapropionate of PE tetrahydroxypropyl ether having the structural formula: $C(CH_2OCH_2CH_2CH_2OOCCH_2CH_3)_4$. | −17 | 4.9 | 85 | 3,320 | Do. |
| G | Tetrabutyrate of PE tetrahydroxypropyl ether having the structural formula: $C(CH_2OCH_2CH_2CH_2OOCCH_2CH_2CH_3)_4$. | −24 | 4.9 | 87 | 2,720 | Do. |

See references at bottom of table.

| Example | Plasticizer | Low Temp. Flex. | Room Temp. Flex. | Shore Hardness 15 seconds | Ultimate Tensile lb./in.² | Volatility Per Cent wt. loss, 10 days at 105° C. |
|---|---|---|---|---|---|---|
| H | Tripropionate of PE monoacetate trihydroxypropyl ether having the structural formula: $CH_3COOCH_2C(CH_2OCH_2CH_2CH_2OOCCH_2CH_3)_3$. | −4.2 | 5.1 | 84 | 2,630 | fair. |
| I | Tributyrate of PE monoacetate trihydroxypropyl ether having the structural formula: $CH_3COOCH_2C(CH_2OCH_2CH_2CH_2OOCCH_2CH_2CH_3)_3$. | −8.7 | 5.2 | 86 | 2,530 | good. |
| J | Tripropionate of PE monopropionate trihydroxyethyl ether having the structural formula: $CH_3CH_2COOCH_2C(CH_2OCH_2CH_2OOCCH_2CH_3)_3$. | −12.9 | 5.3 | 82 | 2,270 | Do. |
| K | Tributyrate of PE monopropionate trihydroxyethyl ether having the structural formula: $CH_3CH_2COOCH_2C(CH_2OCH_2CH_2OOCCH_2CH_2CH_3)_3$. | −19.3 | 5.3 | 82 | 2,270 | Do. |
| L | Flexol DOP | −17 | 5.0 | 70 | 1,956 | Do. |
| M | Flexol DOP-Special | −12 | 5.1 | 80 | 2,393 | Do. |

Flexol DOP is manufactured by Carbide and Carbon Chemicals Corporation, and has been disclosed in the literature, for instance Plasticizer Chart No. 4, Modern Plastics Encyclopedia, Modern Plastics Inc., New York, N. Y., 1947, as di-2-ethylhexylphthalate.

Flexol DOP Special is merely an improved Flexol DOP.

The plasticizers which are found to give the most satisfactory results are the tetrapropionates and the tetrabutyrates of pentaerythritol tetrahydroxyethyl ether and pentaerythritol tetrahydroxypropyl ethers, as the esters of the lower fatty acids do not impart satisfactory plasticity to the films, whereas the esters of the longer chain acids, such as the laurates, are not sufficiently compatible with the vinyl polymers. Better low temperature flexibility has been obtained with the butyrates of the pentaerythritol tetrahydroxyalkyl ethers than with the esters of pentaerythritol octahydroxyalkyl ethers.

While I have described my invention above in detail, it is to be understood that many changes may be made therein without departing from my invention. For instance, the proportions of the various constituents of the compositions may be varied as desired.

I claim:

1. A vinyl chloride vinyl acetate copolymer resin containing a plasticizer consisting of a substituted pentaerythritol wherein each of the original hydroxyl groups of the pentaerythritol are replaced, three of the original hydroxyl groups of each monopentaerythritol group being replaced by an acylated hydroxyalkyl ether group the acyl group being derived from an aliphatic fatty acid having 2 to 4 carbon atoms and the last remaining hydroxyl group of each monopentaerythritol group being replaced by an acyl group derived from an aliphatic fatty acid containing two to four carbon atoms.

2. A vinyl chloride vinyl acetate copolymer resin containing from 10 to 50% by weight of a plasticizer consisting of a substituted pentaerythritol wherein each of the original hydroxyl groups are replaced, at least three of said original hydroxyl groups being each replaced by an acylated hydroxyalkyl ether group the acyl group being derived from an aliphatic fatty acid having 2 to 4 carbon atoms and the last remaining group being replaced by the acyl radical of propionic acid, said pentaerythritol being compatible with said resin and including in addition to the aforesaid plasticizer, a lubricant and a stabilizer.

3. A vinyl chloride vinyl acetate copolymer resin containing from 10 to 50% by weight of a plasticizer consisting of a substituted pentaerythritol wherein each of the original hydroxyl groups of the pentaerythritol are each replaced by the propionic acid ester of a hydroxyalkyl ether.

4. A vinyl chloride vinyl acetate copolymer resin containing from 10 to 50% by weight of a plasticizer consisting of a substituted pentaerythritol wherein each of tne original hydroxyl groups of the pentaerythritol are each replaced by the butyric acid ester of a hydroxyalkyl ether.

5. A vinyl chloride vinyl acetate copolymer resin containing a plasticizer consisting of a substituted pentaerythritol wherein each of the original hydroxyl groups of the pentaerythritol are replaced, at least three of the original hydroxyl groups of each mono-pentaerythritol group being replaced by an acylated hydroxyalkyl ether, and the remaining hydroxyl group being replaced by a radical selected from the group consisting of acylated hydroxyalkyl ether and acyl, all of the acyl groups hereof being derived from a fatty acid having 2–4 carbon atoms and the alkyl group containing 2–4 carbon atoms.

6. A vinyl chloride vinyl acetate copolymer resin containing a plasticizer consisting of a substituted pentaerythritol wherein each of the original hydroxyl groups of the pentaerythritol are replaced by an acylated hydroxyalkyl ether the acyl group thereof being derived from a fatty acid having 2 to 4 carbon atoms and the ether group containing 2 to 4 carbon atoms.

7. A vinyl chloride vinyl acetate copolymer resin containing from 10 to 50% by weight of a plasticizer consisting of the tributyrate ester of pentaerythritol monopropionate trihydroxyethyl ether, said pentaerythritol being compatible with said resin and including in addition to the aforesaid plasticizer, a lubricant and a stabilizer.

8. A vinyl chloride vinyl acetate copolymer resin containing from 10 to 50% by weight of a plasticizer consisting of a substituted pentaerythritol wherein each of the original hydroxyl groups of the pentaerythritol are each replaced by the butyric acid ester of a hydroxyethyl ether.

9. A vinyl chloride vinyl acetate copolymer resin containing from 10 to 50% by weight of a plasticizer consisting of a substituted pentaerythritol wherein each of the original hydroxyl groups of the pentaerythritol are each replaced by the butyric acid ester of a hydroxypropyl ether, said pentaerythritol being compatible with said resin and including in addition to the aforesaid plasticizer, a lubricant and a stabilizer.

10. A vinyl chloride vinyl acetate copolymer resin containing from 10 to 50% by weight of a plasticizer consisting of a substituted pentaerythritol wherein each of the original hydroxyl groups of the pentaerythritol are each replaced by the propionic acid ester of a hydroxyethyl ether, said pentaerythritol being compatible with said resin and including in addition to the aforesaid plasticizer, a lubricant and a stabilizer.

11. A vinyl chloride vinyl acetate copolymer resin containing from 10 to 50% by weight of a plasticizer consisting of a substituted pentaerythritol wherein each of the original hydroxyl groups of the pentaerythritol are each replaced by the propionic acid ester of a hydroxypropyl ether, said pentaerythritol being compatible with said resin and including in addition to the aforesaid plasticizer, a lubricant and a stabilizer.

CHRISTY J. VANDER VALK.

REFERENCES CITED

The following references are of record in the file of this patent:

UNITED STATES PATENTS

| Number | Name | Date |
|---|---|---|
| 1,922,459 | Schmidt et al. | Aug. 15, 1933 |
| 2,381,247 | Barth et al. | Aug. 7, 1945 |